United States Patent
Poisel

(10) Patent No.: US 8,185,077 B2
(45) Date of Patent: May 22, 2012

(54) METHOD AND SYSTEM FOR NOISE SUPPRESSION IN ANTENNA

(75) Inventor: Richard A. Poisel, Vail, AZ (US)

(73) Assignee: Raytheon Company, Waltham, MA (US)

( * ) Notice: Subject to any disclaimer, the term of this patent is extended or adjusted under 35 U.S.C. 154(b) by 660 days.

(21) Appl. No.: 12/356,192

(22) Filed: Jan. 20, 2009

(65) Prior Publication Data

US 2010/0184398 A1 Jul. 22, 2010

(51) Int. Cl.
*H04B 1/10* (2006.01)
*H04B 1/00* (2006.01)
*H04B 15/00* (2006.01)

(52) U.S. Cl. .................... 455/296; 455/63.1; 455/67.13; 455/570; 455/114.2

(58) Field of Classification Search .................. 455/296, 455/308, 297, 303, 309, 310, 311, 312, 63.1, 455/67.13, 67.16, 570, 114.2, 115.1, 514, 455/452.2, 450, 451, 452.1, 500, 509, 517, 455/3.01; 375/371, 372, 376, 138, 346, 130; 702/66, 70, 190; 381/94; 370/328, 329
See application file for complete search history.

(56) References Cited

U.S. PATENT DOCUMENTS

| | | | |
|---|---|---|---|
| 4,403,347 A | 9/1983 | Iso et al. | |
| 4,510,500 A | 4/1985 | Brune | |
| 5,539,832 A * | 7/1996 | Weinstein et al. | 381/94.1 |
| 6,002,776 A * | 12/1999 | Bhadkamkar et al. | 381/66 |
| 6,018,317 A | 1/2000 | Dogan et al. | |
| 6,037,892 A * | 3/2000 | Nikias et al. | 342/25 F |
| 6,208,295 B1 | 3/2001 | Dogan et al. | |
| 6,867,745 B2 | 3/2005 | Dunn, Jr. et al. | |
| 6,894,630 B1 | 5/2005 | Massie et al. | |
| 6,993,440 B2 * | 1/2006 | Anderson et al. | 702/66 |
| 7,039,360 B2 | 5/2006 | Sugiura | |
| 7,714,782 B2 * | 5/2010 | Davis et al. | 342/377 |
| 7,734,434 B2 * | 6/2010 | Han et al. | 702/69 |
| 7,941,170 B2 * | 5/2011 | Maeda et al. | 455/514 |
| 2003/0097439 A1 * | 5/2003 | Strayer et al. | 709/224 |
| 2004/0061659 A1 | 4/2004 | Dunn, Jr. et al. | |
| 2004/0219895 A1 | 11/2004 | O. et al. | |
| 2006/0023775 A1 | 2/2006 | Rimini et al. | |
| 2006/0203943 A1 | 9/2006 | Scheim et al. | |
| 2008/0079639 A1 | 4/2008 | Jen-Huan | |
| 2008/0113639 A1 | 5/2008 | Noro | |
| 2008/0201138 A1 | 8/2008 | Visser et al. | |
| 2009/0102981 A1 * | 4/2009 | Mody | 348/732 |
| 2009/0103592 A1 * | 4/2009 | Beaulieu et al. | 375/138 |
| 2009/0156116 A1 * | 6/2009 | Sheby et al. | 455/1 |

OTHER PUBLICATIONS

J.F. Cardoso et al., Blind Beamforming for Non-Gaussian Signals, IEEE Proceedings, Dec. 1993, vol. 140, No. 6, pp. 362-370.
Athina P. Petropulu et al., Signal Reconstruction From the Phase of the Bispectrum, IEEE Transactions on Signal Processing, Mar. 1992, vol. 40, pp. 601-610.

\* cited by examiner

*Primary Examiner* — Pablo Tran
(74) *Attorney, Agent, or Firm* — Daly, Crowley, Mofford & Durkee, LLP

(57) ABSTRACT

A system includes an antenna to receive a communications signal, an amplifier coupled to the antenna to amplify the communications signal, and a processor coupled to the amplifier to process the communications signal using high-order statistics to suppress noise in the communications signal. The processor may use a bispectrum function to remove at least a portion of the noise, and at least one of the phase of the bispectrum and the amplitude of the bispectrum to reconstruct the communications signal.

28 Claims, 6 Drawing Sheets

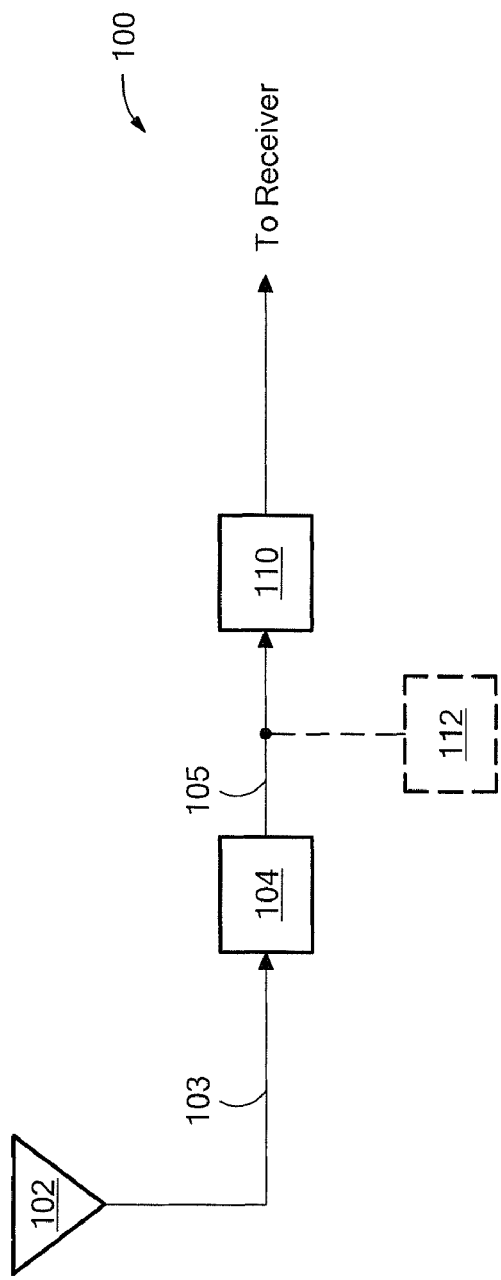
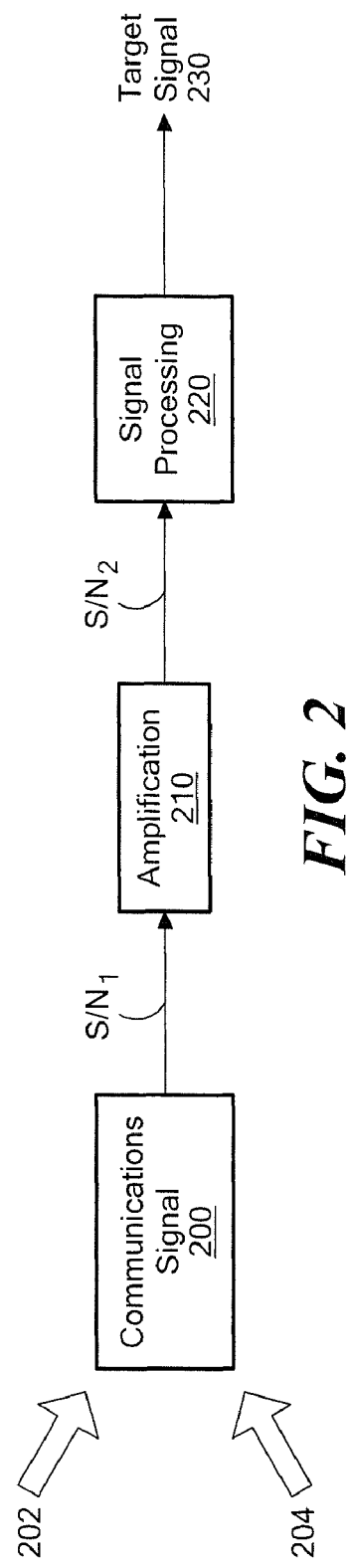
*FIG. 1*
*FIG. 2*

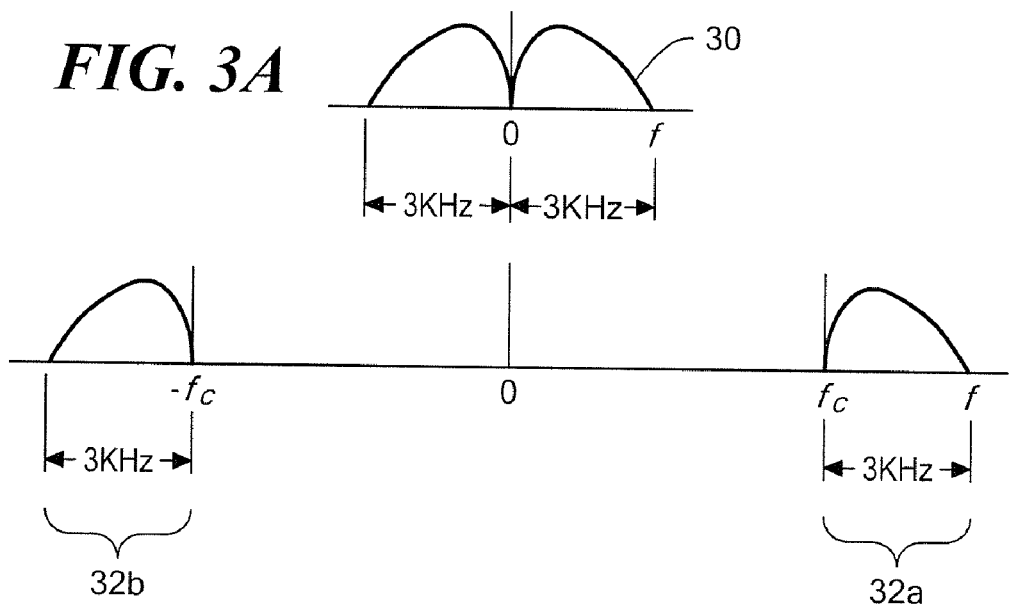
*FIG. 3A*
*FIG. 3B*
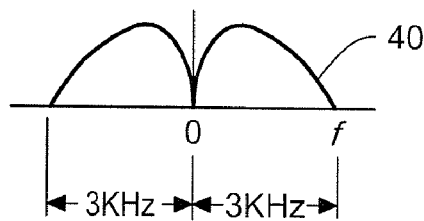
*FIG. 4A*
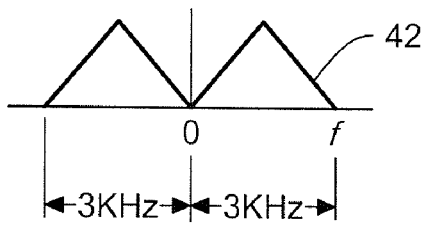
*FIG. 4B*
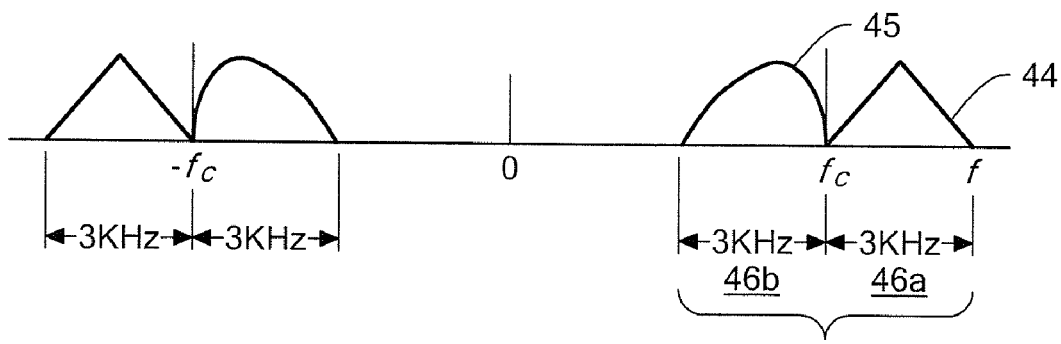
*FIG. 4C*

METHOD AND SYSTEM FOR NOISE SUPPRESSION IN ANTENNA

BACKGROUND

As is known in the art, efficient antennas in the high-frequency range are large. A typical antenna length can be in the range of about $\lambda/2$ to $\lambda/4$, where $\lambda$ is the wavelength of the carrier frequency. For example, the wavelength at 1 Megahertz (MHz) is 300 meters and at 10 MHz is 30 meters. These antennas are too long to be practical for many applications, especially for on-the-move operations requiring portable receivers, such as those carried in backpacks or mounted on vehicles.

As is also known in the art, active antennas reduce the size of the antenna element by using an amplifier to boost input signals. For example, a typical size of an active antenna is 18 inches, which is far less than other antenna designs. A problem with active antennas, however, is that the amplifier increases noise along with the desired target signal. Further, the amplifier can reduce the signal-to-noise ratio of the communications signal at the amplifier output.

SUMMARY

In one aspect of the inventive techniques and systems, noise is suppressed in an antenna using high-order statistical processes. The antenna, which may be of any type known in the art, receives a communications signal which includes a noise component including noise from external and/or internal noise sources, and a target component that is the desired signal. One type of antenna that may be used is an active antenna for receiving high-frequency signals in the range of about 3 Megahertz (MHz) to 30 MHz.

Active antennas include an amplifier to boost the received communications signal. Advantageously, active antennas may use shorter elements than other antenna designs, thereby making the active antenna more practical and portable. For example, on-the-move operations may use active antennas for backpack or vehicle-mounted receivers. While the active antenna amplifier boosts the received communications signal, the noise component of the communications signal is undesirably increased (i.e., the signal-to-noise ratio of the communications signal is undesirably decreased). A processor uses third or higher order statistical processing, such as bispectrum processing, to suppress and/or remove the noise component from the communications signal. Such processing does not remove the desired target component of the communications signal, which may be reconstructed using a variety of methods.

By contrast, in the conventional art it is known to use second-order statistical models to process and characterize signal properties. Such second-order models do not use third or higher order components or functions. For example, second-order stochastic models use first and second order components such as the mean (average value of the signal) and variance (distribution of a signal about the mean) to characterize the probability distribution of a signal. An autocorrelation function may be used for finding repeating patterns for stochastic processes, represented in Equation (1) as:

$$R_{xx}(\tau) = E\{x(t)x(t+\tau)\} \qquad \text{Eq. (1)}$$

Here, $x(t)$ represents a stochastic process, E denotes the expectation operator, t represents time, and $\tau$ represents the autocorrelation lag.

The mean and variance can completely characterize a signal with a Gaussian (normal) probability distribution. The power spectral density $S_{xx}(\omega)$, where $\omega$ is the angular frequency, is given by the Fourier transform of the autocorrelation function (Weiner-Khinchine) as in Equation (2):

$$S_{xx}(\omega) = \frac{1}{2\pi} \int_{-\infty}^{\infty} R_{xx}(\tau) e^{-j\omega\tau} d\tau \qquad \text{Eq. (2)}$$

where $R_{xx}(\tau)$ is the autocorrelation function of process $x(t)$, defined by Equation (1).

While spectra higher than the second-order spectra for Gaussian signals are identically zero, such is not true for other type of signals characterized by a power spectral density (PSD) with third or higher-order spectra. However, the power in third-order spectra for signals characterized by symmetric PSDs is reduced and in particular, the third-order spectra are zero for processes characterized by Gaussian, Laplace, and uniform probability density functions. Third-order spectra can therefore be suppressed and/or removed using, for example, the bispectrum. It will be understood, however, that other types of high-order statistical models may be used including, but not limited to, the high-order polyspectra. For example, the fourth-order cumulant (trispectrum) and all higher order polyspectra of the Gaussian processes are zero and can used to suppress noise characterized by Gaussian PSDs.

High-order statistical processing includes third or higher-order components and functions to characterize signals. Advantageously, the bispectrum of a process is reduced or identically zero for any independent and identically distributed stochastic process with a symmetric PSD. Because many noise phenomena are characterized by symmetric PSDs, the bispectrum may be used to suppress and/or remove the undesirable noise component from a received and/or amplified communications signal. Further, the desirable target component of the communications signal may be reconstructed from the phase and/or amplitude of the bispectrum.

It should be noted that some of the target components may also be characterized by symmetric PSDs and may be suppressed and/or removed by the bispectrum. For example, amplitude modulation double-side band (AM-DSB), frequency-shift keying (FSK), and phase-shift keying (PSK) signals are characterized by symmetric PSDs. However, the most predominant analog modulations found in high-frequency communications, such as single-side band (SSB) and independent-side band (ISB), are characterized by non-symmetric PSDs. Therefore, these signals are not significantly suppressed and/or removed by the bispectrum. Advantageously, SSB and ISB signals, as well as other analog and digital formats, can be recovered after high-order statistical processing to suppress and/or remove noise.

In accordance with an embodiment of the invention, a method includes, in an antenna, receiving a communications signal, amplifying the communications signal, and processing the communications signal using high-order statistics to suppress noise in the communications signal.

In further embodiments, the method can include one or more of the following features: wherein the communications signal is a high-frequency signal in the range of about 3 MHz to about 30 MHz; wherein the communications signal includes a noise component and a target component and processing the communications signal further includes suppressing the noise component; wherein suppressing the noise component includes using a bispectrum function to remove at least a portion of the noise component; reconstructing the target component of the communications signal using at least one of the phase of the bispectrum and the amplitude of the bispectrum; wherein the noise is at least one of an external noise and an internal noise; wherein the external noise includes at least one of an atmospheric noise, a thermal noise, a man-made noise, and a galactic noise; wherein the internal noise includes at least one of a thermal noise, a flicker noise, a shot noise, and a Johnson noise; and wherein suppressing the noise includes removing the noise.

In another aspect, an embodiment of the invention includes a method of noise suppression in an active high-frequency antenna including receiving a communications signal in the active antenna, the communications signal including a noise component and a target component, amplifying the communications signal, and processing the communications signal using a bispectrum function to remove at least a portion of the noise component of the communications signal.

In further embodiments, the method can include one or more of the following features: using at least one of the phase and amplitude of the bispectrum to obtain the target component of the communications signal, and enabling output of the target component; wherein the noise component includes an external noise component and an internal noise component and processing further includes removing the external noise component and removing the internal noise component; wherein the external noise component includes a plurality of external noise components, and the internal noise component comprises a plurality of internal noise components; wherein the noise component is characterized by a Gaussian power spectral density; wherein the noise component is characterized by a symmetric alpha stable power spectral density.

In another aspect, an embodiment of the invention includes a system including an antenna to receive a communications signal, an amplifier coupled to the antenna to amplify the communications signal, and a processor coupled to the amplifier to process the communications signal using high-order statistics to suppress noise in the communications signal.

In further embodiments, the system can include one or more of the following features: wherein the communications signal is a high-frequency signal in the range of about 3 MHz to about 30 MHz; wherein the communications signal includes a noise component and a target component and the processor suppresses the noise component; wherein the processor uses a bispectrum function to remove at least a portion of the noise component; wherein the processor uses at least one of the phase of the bispectrum and the amplitude of the bispectrum to reconstruct the target component of the communications signal; wherein the noise is at least one of an external noise and an internal noise; wherein the external noise includes at least one of an atmospheric noise, a thermal noise, a man-made noise, and a galactic noise; wherein the internal noise includes at least one of a thermal noise, a flicker noise, a shot noise, and a Johnson noise; wherein the processor removes the noise component.

In another aspect, an embodiment of the invention includes a system to suppress noise in an active high-frequency antenna including an active antenna to receive a communications signal, the communications signal including a noise component and a target component, an amplifier to amplify the communications signal, and a processor to suppress at least a portion of the noise component of the communications signal using a bispectrum function.

In further embodiments, the system can include one or more of the following features: wherein the processor uses at least one of the phase of the bispectrum and the amplitude of the bispectrum to obtain the target component of the communications signal, wherein the processor provides an output of the target component; wherein the noise component includes an external noise component and an internal noise component and the processor removes at least a portion of the external noise component and at least a portion of the internal noise component; wherein the external noise component includes a plurality of external noise components, and the internal noise component includes a plurality of internal noise components; wherein the noise component is characterized by a Gaussian power spectral density; wherein the noise component is characterized by a symmetric alpha stable power spectral density;

In another aspect, an embodiment of the invention includes a computer program product in a computer-readable medium for use with a computer system, the computer program product including a high-order statistical processing module to suppress at least a portion of a noise component of a communications signal received in a receiver.

In further embodiments, the computer program product can include one or more of the following features: wherein the high-order statistical processing module uses a bispectrum function to suppress the noise component; a reconstruct module to reconstruct a target component of the communications signal and an output module to enable output of the target component; wherein the reconstruct module uses at least one of the phase of the bispectrum and the amplitude of the bispectrum to reconstruct the target signal.

BRIEF DESCRIPTION OF THE DRAWINGS

The foregoing features of this invention, as well as the invention itself, may be more fully understood from the following description of the drawings in which:

FIG. 1 is a pictorial representation of a system including an active antenna and high order processor;

FIG. 2 is a representational diagram of an illustrative signal associated with the system in FIG. 1;

FIG. 3A shows an illustrative power spectral density (PSD) of a baseband signal to be modulated onto a carrier by amplitude modulation;

FIG. 3B shows an illustrative PSD of a single side band modulation for an upper sideband applied to the baseband signal of FIG. 3B of the type for use with embodiments of the invention;

FIGS. 4A, 4B, and 4C show illustrative PSDs of an ISB signal associated with embodiments of the invention;

DETAILED DESCRIPTION

Figure 5:
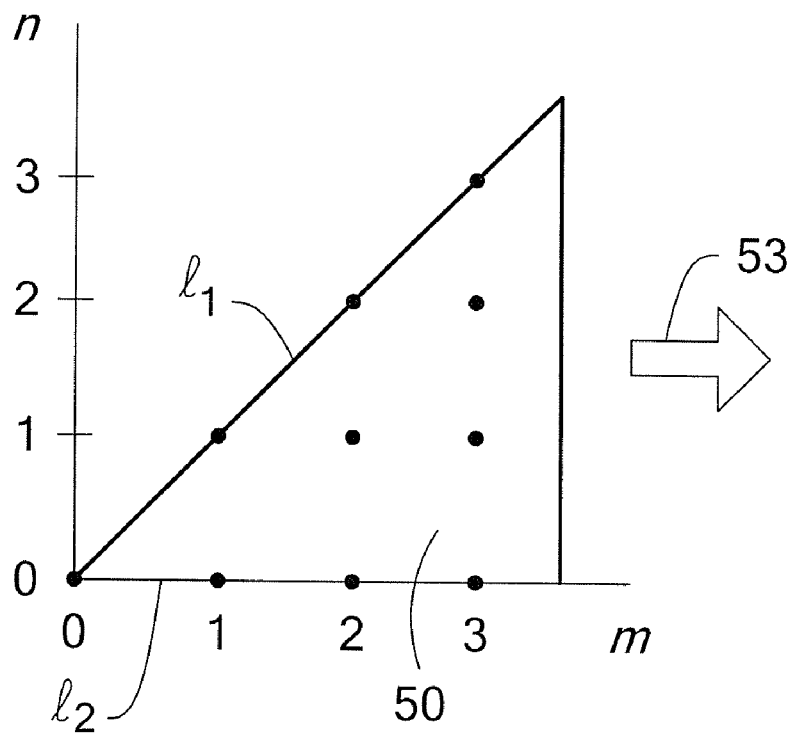
FIG. 5 shows an illustrative "infinite" triangle including third moments associated with high-order statistics of the type used in the system of FIG. 1.

Referring to FIG. 1, a system 100 for noise suppression includes an antenna 102 to receive a communications signal 103 and an amplifier 104 to amplify the communications signal 103. The system 100 includes a processor 110 to process the communications signal 103 using high-order statistics. Such high-order statistics can advantageously process a received communications signal to suppress and/or remove noise in the communications signal 103.

It will be understood that system 100 can perform many functions other than noise suppression including, but not limited to, determining time differences of a signal between two systems, determining the direction of arrival of a signal in a system having two receiving channels, and detecting energy to determine a presence of a signal. Yet another application of the system 100 is to suppress and/or remove destructive signal leakage from broadband over power lines (BPL) internet access. Still another application of the system 100 is to reduce noise in radio frequency identification (RFID) tags, such as those utilizing high-frequencies. Yet another application of system 100 is to identify the type of modulation on signal 103.

Optionally, the system includes analog-to-digital converter (ADC) 112 operative to provide a digital signal to the processor 110. Applications of the system 100 described herein may be performed in the digital domain on the digital signal.

The system 100 may include an active antenna for use in high-frequency communications in the range of about 3 MHz to 30 MHz. It will be understood, however, that the system 100 may incorporate other antenna types for use in medium frequency (MF), shortwave, very-high frequency (VHF) and ultra-high frequency (UHF) communications.

Referring now to FIG. 2, an illustrative communications signal 200 of the type which may be received, amplified, and processed by system 100 (FIG. 1) includes a target component 202 and a noise component 204. The target component 202 is the desired signal and the noise component 204 comprises noise from external and/or internal noise sources. The received communications signal 200 is characterized by a first signal-to-noise ratio $S/N_1$ representing the ratio of signal power to noise power, as shown in Equation (3).

$$S/N_1 = \rho_{signal}/\rho_{noise} \qquad \text{Eq. (3)}$$

Here, $\rho_{signal}$ includes the desired signal power and $\rho_{noise}$ includes noise power.

The received communications signal is amplified 210 to obtain an amplified signal characterized by a second signal-to-noise ratio $S/N_2$. In many instances, the amplification 210 may further degrade the signal-to-noise ratio of the received communications signal and, therefore, $S/N_2$ may be smaller than $S/N_1$.

The amplified signal is processed 220 to suppress and/or remove the noise component 204, resulting in the target signal 230. Further, noise added by amplification 210 can also be suppressed/removed by signal processing 220. As will be described below, high-order statistical models are used to suppress and/or remove the undesirable noise component 204. For example, the bispectrum, which is suppressed or zero for signal sources characterized by symmetric power spectral densities (PSDs), may be used to suppress and/or remove noise sources having symmetric PSDs. Advantageously, many common noise sources have symmetric PSDs. Further, many common communications signals have non-symmetric PSDs and, therefore, the bispectrum processing will leave such portions (i.e., the meaningful information) of the signal intact. The non-symmetric communications signals may be reconstructed using the phase and/or amplitude of the bispectrum.

Analog and digital signals include the types of communications signals for use with system 100 (FIG. 1). For spectral efficiency reasons, in many frequency ranges, including the HF range, the predominant analog signals are single sideband (SSB) signals in which one of the redundant sidebands in regular amplitude modulation (AM) has been removed. A typical baseband signal to be modulated onto a carrier by amplitude modulation is shown in FIG. 3A. A typical PSD after SSB modulation for upper sideband (USB) and after the lower sideband (LSB) has been removed from signal 30 is shown in FIG. 3B, where the horizontal axis represents frequency f and the vertical axis represents the magnitude of the PSD of the signal 30.

Removal of the sideband causes the PSD of SSB signals to become asymmetric. As shown in FIG. 3B, AM with a suppressed carrier frequency $f_c$, $-f_c$ modulated to become transmittable has symmetric PSDs 32a, 32b. Such signals are rarely seen, however, outside of amateur radio. Instead, two independent SSB signals 40, 42 shown in FIG. 4A and FIG. 4B, respectively, are combined on the same carrier, one upper sideband 44 and one lower sideband 45 as shown in FIG. 4C. This effectively doubles the throughput of the AM signal while requiring allocation of two adjacent channels, for example, 3 kilohertz (KHz) channels 46a, 46b in the high-frequency band. Such an arrangement is known as independent sideband (ISB) modulation, which is characterized by an asymmetric PSD 48.

It will be understood by one of ordinary skill in the art that signal 30 may be a digital signal. For example, signal 30 may be an on-off keyed (OOK), an example of which includes Morse code transmissions. Yet another digital signal that can be represented by signal spectrum 30 is amplitude shift keying (ASK), which is similar to OOK except that the second amplitude is not zero (corresponding to the "off" portion in OOK). ASK signals need not be restricted to two discrete amplitudes, as the same spectrum 30 may apply to ASK signals with M discrete levels.

In addition, while the average PSD of frequency shift keyed (FSK) digital signals have symmetric PSDs, the PSD is asymmetric for the duration of a single information baud/bit. For sufficiently slow FSK, limited only by the processing speed of processor 110, the noise in such FSK signals can be reduced or reduced by system 100.

High-order statistics, such as those used in conjunction with the system 100 (FIG. 1), will now be described in more detail. A sampled process that is a real discrete process x(k) may be independent and identically distributed, third-order stationary, and may have a zero mean. The third moment sequence of the process x(k) can be represented in Equation (4):

$$R(m, n) = E\{x(k)x(k+m)x(k+n)\} \qquad \text{Eq. (4)}$$

Here, E denotes the expectation function. The third moments have the following symmetry properties represented in Equation (5):

$$R(m, n) = R(n, m) = R(-n, m-n) = R(n-m, -m) = R(m-n, -n) = R(-m, n-m) \qquad \text{Eq. (5)}$$

As a consequence, knowing the third moments of the "infinite" triangle can be used to find the entire third moment sequence. FIG. 5 shows an example infinite triangle 50 bounded by the line $l_1$ at m=0, line $l_2$ at m=n, and infinite in the direction of arrow (designated by reference numeral 53). The third moment sequence only needs to be evaluated at all the coordinate values (m, n) within triangle 50 because of the symmetries identified in Equation (5). Once the values are known within triangle 50, the values are known everywhere. The values must be determined at all the (m, n) points in the triangle 50, however. The two sides of the infinite triangle 50 are defined by m≧0 and n=m.

The bispectrum of the process x(k) can be defined as the Fourier transform of its third moment sequence as in Equation (6):

$$B(w_1, w_2) = \sum_{m=-\infty}^{\infty}\sum_{n=-\infty}^{\infty} R(m, n)\exp[-j(mw_1 + nw_2)] \quad \text{Eq. (6)}$$

$$|w_1|, |w_2| \leq p$$

Here, $B(\omega_1, \omega_2)$ is the bispectrum of x(k), and ω denotes angular frequency. In general, $B(\omega_1, \omega_2)$ is complex and a sufficient condition for its existence is that R(m, n) is absolutely summable. Using the properties of R(m, n) in Equation (5), the following symmetry properties can be derived for the bispectrum B in Equation (7):

$$\begin{aligned}B(\omega_1, \omega_2) &= B(\omega 2, \omega 1) \quad \text{Eq. (7)}\\&= B^*(-\omega 2, -\omega 1)\\&= B(-\omega 1 - \omega 2, \omega 2)\\&= B(\omega 1, -\omega 1 - \omega 2)\\&= B(-\omega - \omega 2, \omega 1)\\&= B(\omega 2, -\omega 1 - \omega 2)\end{aligned}$$

Figure 6:
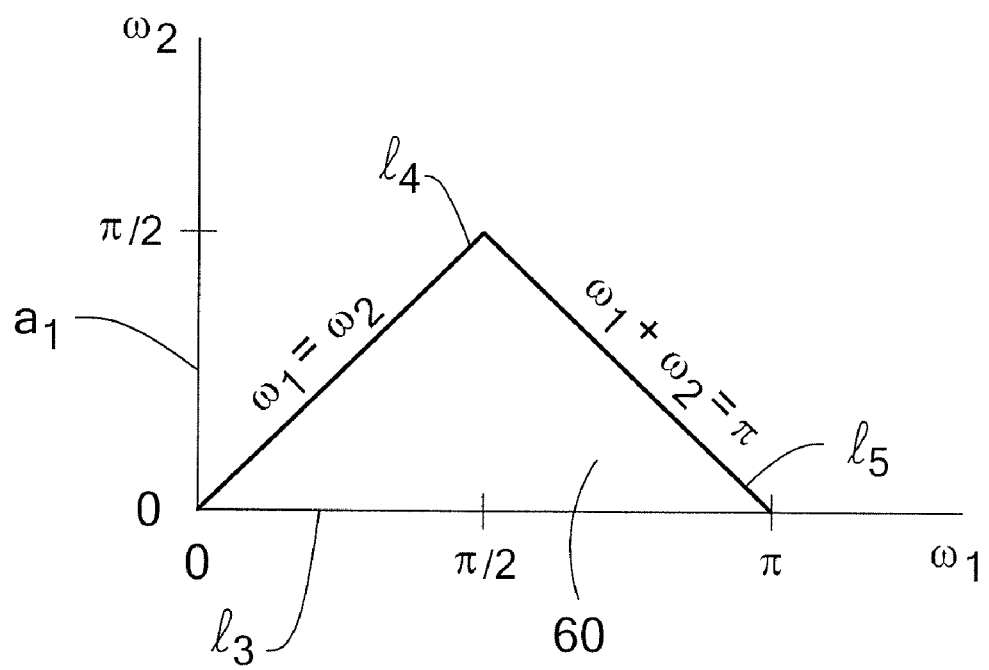
FIG. 6 shows an illustrative bounded region triangle of the bispectrum associated with high-order statistics of the type used in the system of FIG. 1.

Also, $B(\omega_1, \omega_2)$ is periodic in $\omega_1$ and $\omega_2$ with period $2\pi$. Thus, as shown in FIG. 6, knowledge of the bispectrum in the triangular region 60 defined by vertical axis $a_1$ at $\omega_2=0$, line $l_3$ at $\omega_1=0$, line $l_4$ at $\omega_1=\omega_2$, and line $l_5$ at $\omega_1+\omega_2=\pi$ is enough for a complete description of the bispectrum.

In a further embodiment of the inventive techniques, systems, and concepts describe herein, a noise component (such as noise component 204 represented in FIG. 2) includes a noise source that may be characterized by a Gaussian PSD or a symmetric α-stable PSD. These noise sources degrade the integrity of a communications signal associated with the system 100 (FIG. 1). As described below, both of these noise sources have symmetric PSDs.

Many noise sources, although characterized by symmetric PSDs, are not adequately modeled as Gaussian, yet may be characterized by symmetric PSDs. Such processes can be modeled as symmetric α-stable processes (SαS). A process is SαS if the process's PSD is symmetric and α-stable. It should be noted that the Gaussian PSD is also an α-stable PSD where α=2.

External noise sources, such as atmospheric noise, are frequently modeled as SαS processes. For example, atmospheric noise has an impulsive nature (including, for example, lightning strikes) and may be modeled as an SαS process. Further, man-mode noise sources such as those originating from arc-welders may also be impulsive in nature and modeled using an SαS PSD. Such α-stable noise sources can be suppressed and/or removed using the bispectrum, because such processing suppresses or eliminates the noise from the bispectrum for processes with symmetric PSDs.

Figure 7A:
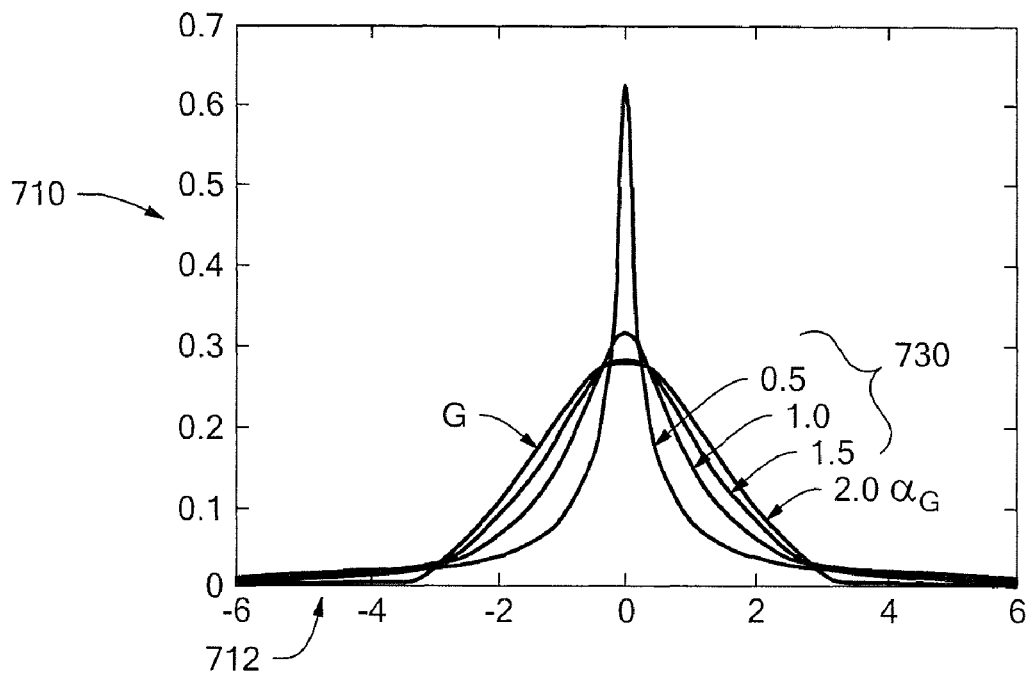
FIG. 7A shows illustrative spectra of processes associated with embodiments of the invention.
Figure 7B:
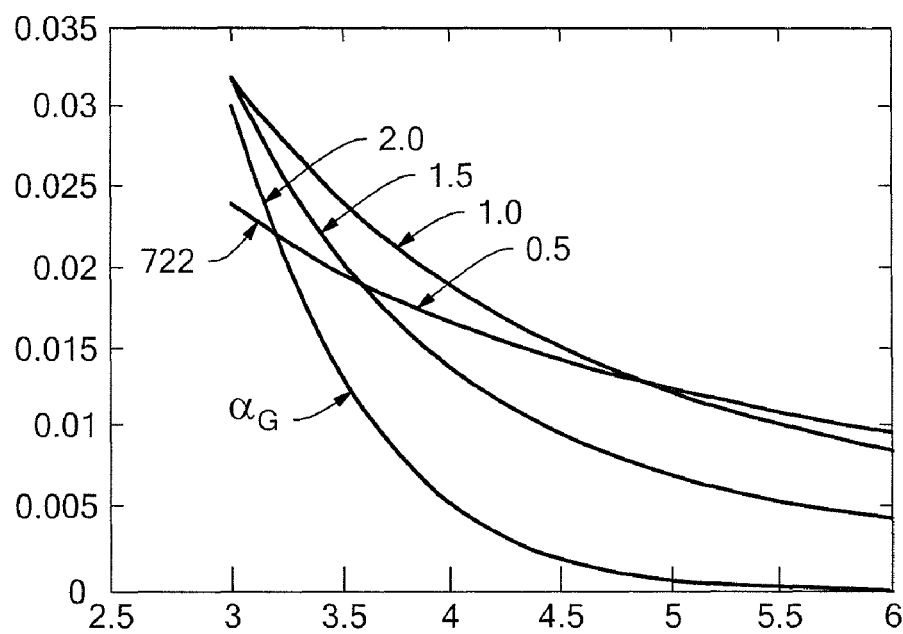
FIG. 7B is a close-up view of the tails of the spectra shown in FIG. 7A.

FIG. 7A shows illustrative spectra for a few standard SαS processes having values α=0.5, α=1, and α=1.5, as designated by reference numeral 730. A Gaussian process G with alpha value $\alpha_G$=2.0 is also shown for comparison with the SαS processes that have lower α values. As can be seen in a close-up view of the spectra shown in FIG. 7B, the tails of SαS processes (an example of which is designated by reference numeral 722 corresponding to α=0.5) are heavier than the tail of the Gaussian spectra $\alpha_G$. Advantageously, heavier tails in the SαS processes allow for higher probabilities of noise with large amplitudes, which can allow more accurate modeling of certain types of noise, such as atmospheric noise.

Noise of the type encountered and suppressed and/or removed by system 100 (FIG. 1) can be divided into two categories: (1) those external to the system 100; and (2), those internal to the system 100. External noise sources frequently dominate over the internal noise sources, especially in the exemplary high-frequency communications band. In a further embodiment of the inventive techniques, systems, and concepts described herein, a system (such as the illustrative system 100 of FIG. 1) processes a communications signal using high-order statistics to remove at least one external noise component and/or at least one internal noise component. For example, the communications signal 103 may be processed to remove an external noise component originating from a lightning strike and processed to remove an internal noise component originating from shot noise. It will be understood by one of ordinary skill in the art, however, that the order of the processing of the external and internal noise components may be reversed.

The most important external noise sources in the high-frequency range include atmospheric, thermal, man-made, and galactic noises. The effect of these multiple noise sources often combine to form multiple noise components in a given communications signal. Further, these noise components become more or less prevalent at certain frequencies. For example, atmospheric noise becomes less prevalent around 8 MHz, and man-made noise begins to dominate and may remain the dominant noise source from about 8 MHz up to about 1 Gigahertz (GHz).

Lightning strikes, which produce atmospheric noise, are often the dominant noise component because of their high power signatures and ability to propagate for considerable distances in the high-frequency range. Lightning strikes may be modeled as symmetric alpha stable processes and, therefore, high-order statistics, such as the bispectrum, may be used to suppress lightning strike induced noise from the desired communications signal.

Black body thermal radiators produce thermal noise. For example, the sky can be modeled as a black body thermal radiator with intermittent bright spots due to stars and planets. The Sun and the Milky Way galaxy are the primary sources of galactic noise on the Earth.

Man-made noise includes electrical noise from electrical equipment. Electrical noise is often impulsive, i.e., characterized by bursts of power of very short duration. Further, electrical noise may be broadband. Sparks in automotive ignition systems are a common form of electrical noise prevalent in urban environments and along highways with heavy road traffic.

The most important internal noise sources in the high-frequency range include shot, flicker, and Johnson noises. Shot noise is due to the discrete quantum nature of electron flow through a potential barrier. Shot noise includes additional current fluctuations that occur when a voltage is applied to a conductor and a macroscopic current starts to flow. It is most often associated with diodes and bipolar junction transistors (BJTs). Shot noise includes random fluctuations of the electric current in an electrical conductor, caused by discrete current charges (electrons).

Figure 8:
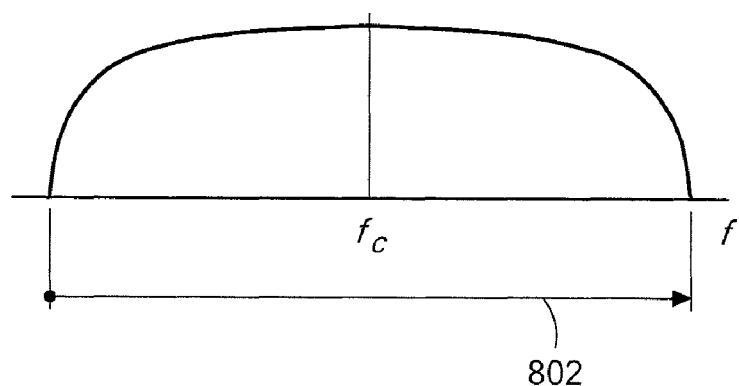
FIG. 8 is an illustrative PSD of shot noise signal associated with the noise component shown in FIG. 2.

An illustrative PSD for shot noise is shown in FIG. 8. Here, the horizontal axis shows the frequency f and the vertical axis shows the magnitude of the PSD of the shot noise. The shot noise is centered about carrier frequency $f_c$. One important aspect of shot noise is the wide frequency extent 802, which could be several GHz wide.

Flicker noise occurs in all active devices and depends on the DC bias current. In semiconductor devices, the origins of flicker noise are attributed to the effects of contaminants and defects in the crystal structure. In MOS structures, flicker noise is associated with oxide surface states that periodically trap and release carriers. Over the decades, advances in semiconductor processes and fabrication practices have reduced flicker noise due to these imperfections.

Figure 9:
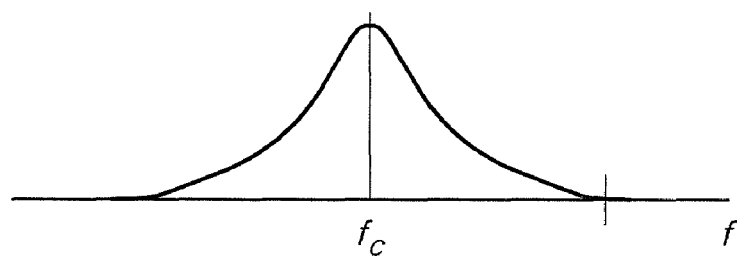
FIG. 9 is an illustrative PSD of flicker noise signal associated with the noise component shown in FIG. 2.

An illustrative PSD for flicker noise is shown in FIG. 9. Flicker noise is limited to a relatively narrow frequency band around the carrier frequency $f_c$ and falls proportionally to 1/f, and in most cases becomes essentially unimportant at a few 100 kHz from each side of the carrier. It is, however, important to narrowband, linear communication systems.

Figure 10:
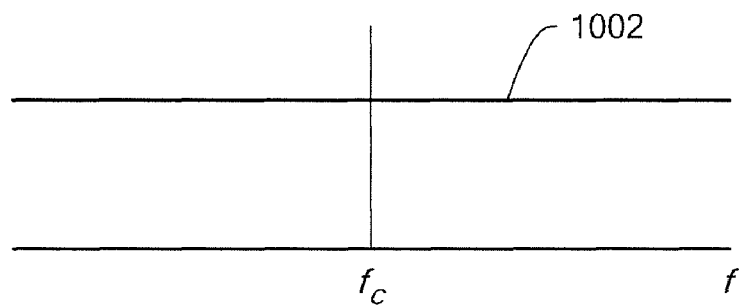
FIG. 10 is an illustrative PSD of Johnson's noise signal associated with the noise component shown in FIG. 2.

Johnson noise (also known as thermal noise) is due to random carrier motion within a device, producing a broadband noise signal. Johnson noise has a Gaussian amplitude distribution in the time domain and is evenly distributed across the spectrum. Johnson noise's spectral breadth and the ubiquity of its sources lead it to dominate other noise sources in many applications. An illustrative PSD of thermal noise is shown in FIG. 10. As can be seen, Johnson noise has a flat amplitude 1002 at all frequencies (up to several GHz).

Figure 11:
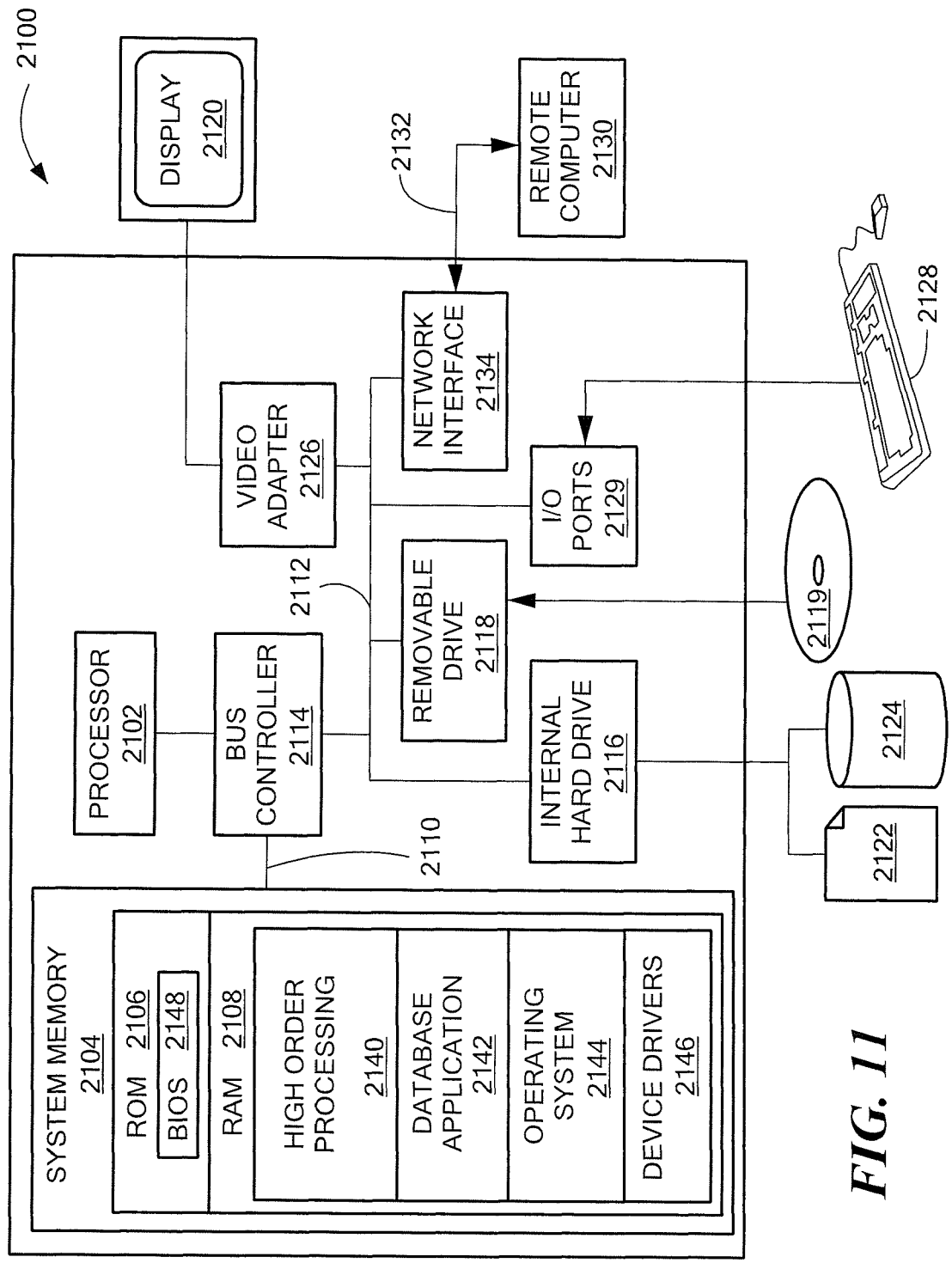
FIG. 11 is a diagram showing an exemplary hardware and operating environment of a suitable computer for use with embodiments of the invention.

FIG. 11 illustrates a computer system 2100 suitable for supporting the operation of an embodiment of the inventive systems, concepts, and techniques described herein. The computer system 2100 includes a processor 2102, for example, a dual-core processor, such as the AMD Athlon™ X2 Dual Core processor from the Advanced Micro Devices Corporation. However, it should be understood that the computer system 2100 may use other microprocessors. Computer system 2100 can represent any server, personal computer, laptop, or even a battery-powered mobile device such as a hand-held personal computer, personal digital assistant, or smart phone.

Computer system 2100 includes a system memory 2104 which is connected to the processor 2102 by a system data/address bus 2110. System memory 2104 includes a read-only memory (ROM) 2106 and random access memory (RAM) 2108. The ROM 2106 represents and device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer system 2100 is stored in ROM 106 and loaded into RAM 2108 upon booting.

Within the computer system 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer system 2100 by using input devices 2128, such as a keyboard and a mouse, which are connected to I/O bus 2112 via I/O ports 2130. Other types of pointing devices that may be used include track balls, joy sticks, and tracking devices suitable for positioning a cursor on a display screen of the display 2120.

Computer system 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing the high order statistical processing to suppress noise in active antennas as described herein. The result of the processing may be rendered and/or output for use in communications and other operations.

The computer system 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2130, video adapter 2126, and printers.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:
1. A method, comprising:
  in an antenna:
    receiving a communications signal including a noise component characterized by a symmetric power spectral density;
    amplifying the communications signal;

processing the communications signal using a bispectrum function to suppress the noise component in the communications signal by modeling the noise component as a symmetric alpha-stable process, including:
  generating third-order moment sequences of the bispectrum function; and
  generating a region of support of the third-order moment sequences,
wherein the bispectrum function is characterized by a first angular frequency and a second angular frequency, the region of support defined within a range of the first angular frequency and within a range of the second angular frequency, said ranges defined where the first angular frequency equals the second angular frequency, the first angular frequency equals zero, and the sum of the first and second angular frequencies equals Pi.

2. The method of claim 1, wherein the communications signal is a high-frequency signal in the range of about 3 MHz to about 30 MHz.

3. The method of claim 1, wherein suppressing the noise component includes removing at least a portion of the noise component.

4. The method of claim 3, wherein the communications signal further includes a target component, further comprising:
  reconstructing the target component of the communications signal using at least one of the phase of the bispectrum and the amplitude of the bispectrum.

5. The method of claim 1, wherein the noise is at least one of an external noise and an internal noise.

6. The method of claim 5, wherein the external noise comprises at least one of an atmospheric noise, a thermal noise, a man-made noise, and a galactic noise.

7. The method of claim 5 wherein the internal noise comprises at least one of a thermal noise, a flicker noise, a shot noise, and a Johnson noise.

8. The method of claim 1, wherein suppressing the noise comprises removing the noise.

9. A method of noise suppression in an active high-frequency antenna, comprising:
  receiving a communications signal in the active antenna, the communications signal comprising a noise component characterized by a symmetric power spectral density and a target component;
  amplifying the communications signal; and
  processing the communications signal using a bispectrum function to remove at least a portion of the noise component of the communications signal by modeling the noise component as a symmetric alpha-stable process, including:
    generating third-order moment sequences of the bispectrum function; and
    generating a region of support of the third-order moment sequences,
wherein the bispectrum function is characterized by a first angular frequency and a second angular frequency the region of support defined within a range of the first angular frequency and within a range of the second angular frequency, said ranges defined where the first angular frequency equals the second angular frequency, the first angular frequency equals zero, and the sum of the first and second angular frequencies equals Pi.

10. The method of claim 9, further comprising:
  using at least one of the phase and amplitude of the bispectrum to obtain the target component of the communications signal; and
  enabling output of the target component.

11. The method of claim 9, wherein the noise component comprises an external noise component and an internal noise component and processing further comprises:
  removing the external noise component; and
  removing the internal noise component.

12. The method of claim 11, wherein the external noise component comprises a plurality of external noise components, and the internal noise component comprises a plurality of internal noise components.

13. The method of claim 9, wherein the noise component is further characterized by a Gaussian power spectral density.

14. A system, comprising:
  an antenna to receive a communications signal including a noise component characterized by a symmetric power spectral density;
  an amplifier coupled to the antenna to amplify the communications signal; and
  a processor coupled to the amplifier to process the communications signal using a bispectrum function to suppress noise component in the communications signal by modeling the noise component as a symmetric alpha-stable process,
wherein the processor generates third-order moment sequences of the bispectrum function and a region of support of the third-order moment sequences, and the bispectrum function is characterized by a first angular frequency and a second angular frequency, wherein the region of support is defined within a ran e of the first angular frequency and within a range of the second angular frequency, said ranges defined where the first angular frequency equals the second angular frequency, the first angular frequency equals zero, and the sum of the first and second angular frequencies equals Pi.

15. The system of claim 14, wherein the communications signal is a high-frequency signal in the range of about 3 MHz to about 30 MHz.

16. The system of claim 14, wherein the processor removes at least a portion of the noise component.

17. The system of claim 16, wherein the communications signal further includes a target component and the processor uses at least one of the phase of the bispectrum and the amplitude of the bispectrum to reconstruct the target component of the communications signal.

18. The system of claim 14, wherein the noise is at least one of an external noise and an internal noise.

19. The system of claim 18, wherein the external noise comprises at least one of an atmospheric noise, a thermal noise, a man-made noise, and a galactic noise.

20. The system of claim 18 wherein the internal noise comprises at least one of a thermal noise, a flicker noise, a shot noise, and a Johnson noise.

21. A system to suppress noise in an active high-frequency antenna, comprising:
  an active antenna to receive a communications signal, the communications signal comprising a noise component characterized by a symmetric power spectral density and a target component;
  an amplifier to amplify the communications signal; and
  a processor to suppress at least a portion of the noise component of the communications signal using a bispectrum function by modeling the noise component as a symmetric alpha-stable process,
wherein the processor generates third-order moment sequences of the bispectrum function and a region of support of the third-order moment sequences, and the bispectrum function is characterized by a first angular frequency and a second angular frequency, wherein the region of support is defined within a range of the first angular frequency and within a range of the second angular frequency, said ranges defined where the first angular frequency equals the second angular frequency, the first angular frequency equals zero, and the sum of the first and second angular frequencies equals Pi.

22. The system of claim 21, wherein the processor uses at least one of the phase of the bispectrum and the amplitude of the bispectrum to obtain the target component of the communications signal, wherein the processor provides an output of the target component.

23. The method of claim 21, wherein the noise component comprises an external noise component and an internal noise component and the processor removes at least a portion of the external noise component and at least a portion of the internal noise component.

24. The system of claim 21, wherein the external noise component comprises a plurality of external noise components, and the internal noise component comprises a plurality of internal noise components.

25. The system of claim 21, wherein the noise component is further characterized by a Gaussian power spectral density.

26. A computer program product in a non-transitory computer-readable medium for use with a computer system, the computer program product comprising:

a bispectrum processing module to suppress at least a portion of a noise component of a communications signal by modeling the noise component as a symmetric alpha-stable process, wherein the bispectrum processing module generates third-order moment sequences of a bispectrum function and a region of support of the third-order moment sequences, and the bispectrum function is characterized by a first angular frequency and a second angular frequency, wherein the region of support is defined within a range of the first angular frequency and within a range of the second angular frequency said ranges defined where the first angular frequency equals the second angular frequency, the first angular frequency equals zero, and the sum of the first and second angular frequencies equals Pi.

27. The computer program product of claim 26, further comprising:
    a reconstruct module to reconstruct a target component of the communications signal; and
    an output module to enable output of the target component.

28. The computer program product of claim 27, wherein the reconstruct module uses at least one of the phase of the bispectrum and the amplitude of the bispectrum to reconstruct the target signal.

* * * * *